Aug. 5, 1941.  B. W. BROWNING  2,251,866
MEASURING DEVICE FOR GARMENTS
Filed Nov. 27, 1940   2 Sheets-Sheet 2
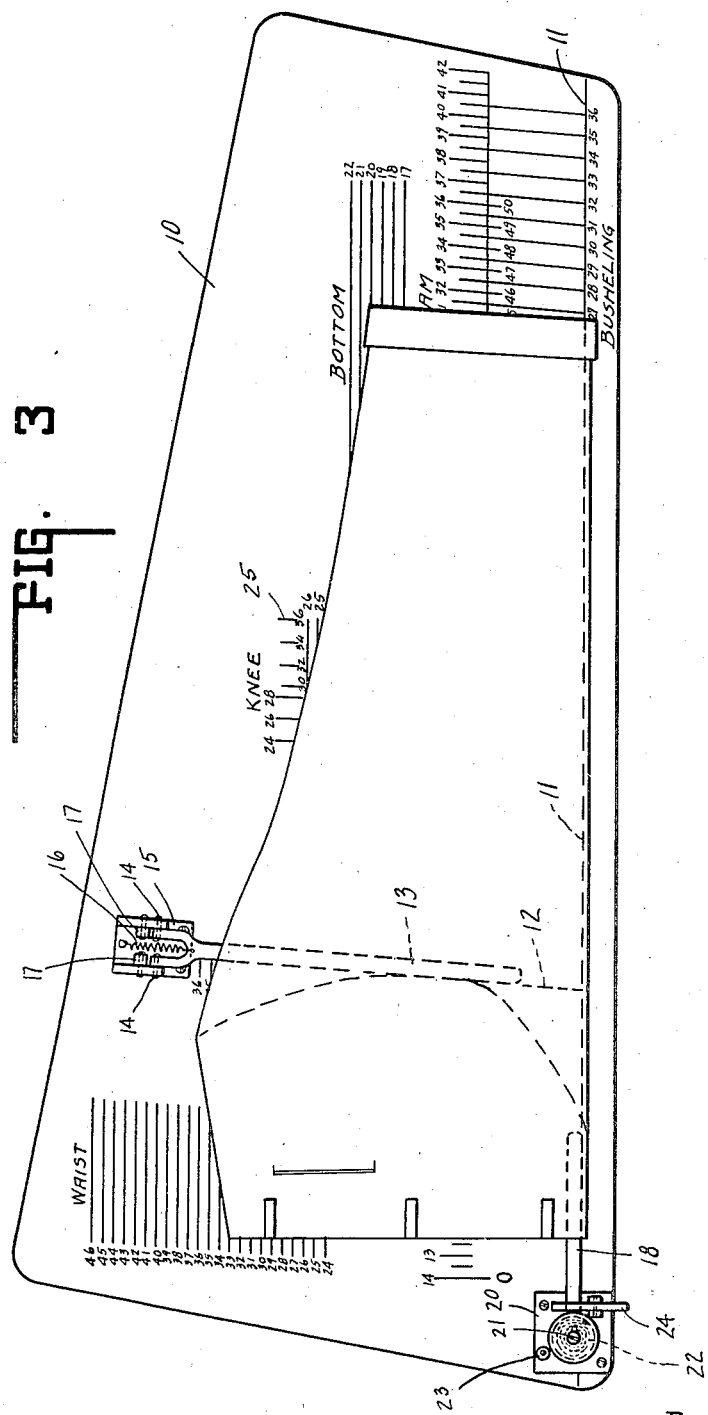
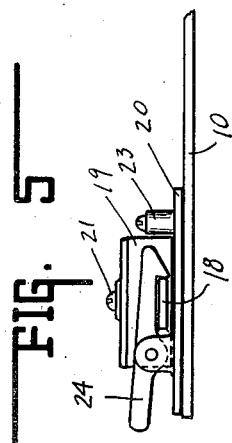
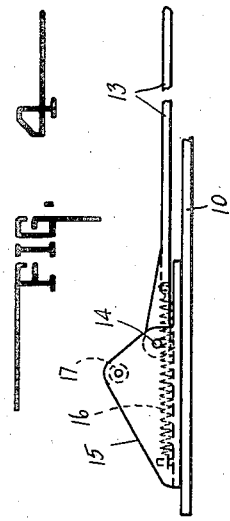
INVENTOR.
BRYAN W. BROWNING,
BY Lockwood, Goldsmith & Galt.
ATTORNEYS.

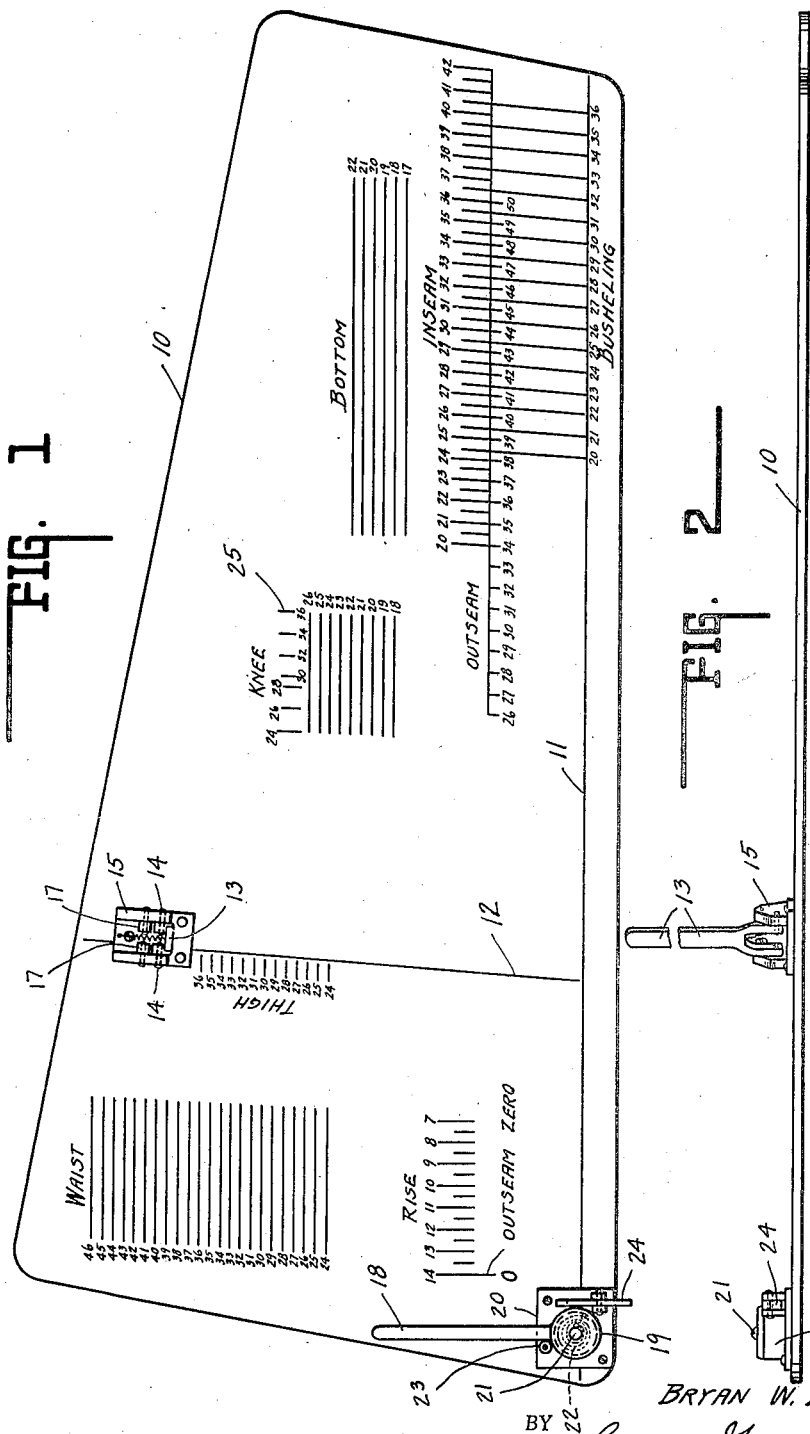

Patented Aug. 5, 1941

2,251,866

UNITED STATES PATENT OFFICE 2,251,866

MEASURING DEVICE FOR GARMENTS

Bryan W. Browning, Terre Haute, Ind.

Application November 27, 1940, Serial No. 367,343

4 Claims. (Cl. 33—2)

This invention relates to a measuring device for garments.

In the manufacture of garments of various types, the last step is a final inspection which includes, in many cases, a complete check of the measurements. In the purchase of garments, particularly in wholesale lots, often the first act of the purchaser is to recheck the dimensions on all or a large number of the garments. On many garments a large number of dimensions must be checked, and it is an arduous, time consuming and expensive task when using a tape measure or a yardstick. This is particularly true of trousers and related garments where at least seven different measurements must be taken on each garment.

One object of the invention is to provide a device by means of which the final check by the manufacturer and the preliminary check by the purchaser may be made as easily and expeditiously as possible. The specific form of the invention disclosed herein by way of illustration, is particularly adapted to the measurement of trousers, but the same principles are applicable to the measurement of coats, vests, shirts and other types of garment.

The invention, in its preferred form, includes a baseboard on which there are marked suitable dimension scales for the various measurements of a garment. These scales are arranged so that little or no change in the position of the garment is required in the use of the full set of scales. This in itself is an important advantage over the use of a yardstick and tape measure. However, the invention also includes means for accurately positioning and holding the garment with respect to the several scales so that the accuracy of measurement is greatly increased and the time required for the operation is correspondingly reduced.

Other objects and features of the invention will be understood from the accompanying drawings and the following description and claims:

Fig. 1 is a plan view of a measuring device constructed in accordance with a preferred form of the invention, with parts in position for receipt of a garment. The device specifically shown is adapted for the measurement of trousers and similar garments. Fig. 2 is a side elevational view of the same. Fig. 3 is a plan view similar to Fig. 1 with a pair of trousers in place for measurement and showing the position of parts during the measuring operation. Fig. 4 if a fragmentary elevational view of one of the garment locating members. Fig. 5 is a fragmentary elevational view of another of said members.

The form of the invention illustrated in the drawings includes a baseboard 10 of suitable size and shape to receive the garment to be measured. On the baseboard there is drawn a number of scales indicated respectively, "Waist," "Rise," "Thigh," "Knee," "Bottom," "Inseam," "Outseam" and "Busheling." These scales are graduated preferably in inches, but may be graduated in any suitable units used in the measuring of garments. On the baseboard 10 there is also marked a pair of reference lines 11 and 12.

One of the garment positioning members is in the form of an arm 13 pivotally mounted by means of a pair of pins 14 on a fitting 15, which is secured to the base 10 in such position that the left-hand edge of the arm 13 coincides with the reference line 12 when said arm is in its lowermost position. An over-center spring 16 is anchored at one end to the fitting 15 and at the opposite end to the arm 13, and normally holds the arm 13 in the upraised position shown in Figs. 1 and 2. In that position said arm engages a pair of stop members 17, preferably in the form of rubber rollers secured to the fitting 15. In the lowermost position of the arm 13, as shown in Fig. 4 the axis of the spring 16 passes slightly beneath the center of the pins 14 and thus yieldingly holds the arm 13 in its lowermost position. The axes of the pins 14 are substantially parallel with the surface of the baseboard 10 and parallel with the axis of the scale indicating the inseam measurement. In the raising and lowering of the arm 13 therefor, said arm travels in a plane at a fixed distance from the several graduations on the inseam scale.

A second positioning member comprises an arm 18 secured to a hollow drum 19 which is pivotally mounted on a plate 20 by means of a vertical pivot screw 21. The plate 20 is secured to the baseboard 10. Within the drum 19 there is provided a torsion spring 22 secured at one end to the pin 21 and at the opposite end to the interior of the drum 19. Said spring normally urges the arm 18 in the counterclockwise direction and holds the same against a rubber bumper 23 mounted on the plate 20. The arm 18 is manually movable against the action of the spring 22 to a position shown in Fig. 3, in which position the edge of said arm coincides with the reference line 11, and the arm extends in a direction substantially perpendicular to the axis of the waist scale. The arm 18 may be held in this position by means of a latch 24, best seen in Fig. 5.

In the use of the invention for a complete check of the dimensions of a pair of trousers, the parts are first positioned as shown in Fig. 1, with the arm 13 upraised and the arm 18 against the stop 23. A pair of trousers is placed on the baseboard 10 and the seams are first inspected and loose threads removed in the usual manner.

Next the trousers are placed with the front crease on the reference line 11 and with the thigh portion opposite the thigh scale and the thigh measurement is then read on said scale.

Next the left leg is lifted, and the arm 13 is lowered into position over the right leg, the left leg being then returned to its normal position above the right leg. The trousers are again placed with the front seam along the reference line 11 and the bottoms are drawn to the right until the inseam fold rests snugly against the arm 13. In this manner the inseam fold is accurately located with respect to the inseam, bottom, knee and rise scales, and these measurements may be read directly on the appropriate scales. The knee scale is provided with cross reference lines 25 indicating the knee position for various lengths of inseams so that the knee measurement may be taken at the proper distance from the inseam fold.

The arm 18 is next moved to the position shown in Fig. 3 within the front fold of the trousers and is latched in that position by the latch 24. The trousers are drawn toward the back of the baseboard 10 until the front fold rests snugly against the arm 18 and the trousers are thus accurately positioned with respect to the waist scale. The waist measurement may then be accurately determined on said scale.

As the last step in the measurement, the trousers are drawn to the left in the drawings until the edge of the waist band coincides with the index marked "Outseam zero." In this position, the outseam measurement may be read on the outseam scale. Since this measurement is the total of the inseam and rise, it is merely a final check, and the trousers need not be positioned as accurately as for the other measurements. In the case of trousers having unfinished bottoms, the busheling measurement may be read instead on the proper scale.

The latch 24 is then released, permitting the arm 18 to move clear of the garment. The garment is then folded for shipment or storage with the arm 13 still in place, and is lifted from the baseboard 10. As soon as the arm 13 has been raised a substantial distance, the spring 16 pulls the same sharply upward and this movement, combined with the movement of the operator's arms, withdraws the arm 13 from the folds of the garment and automatically returns it to its uppermost position. The apparatus is thus left in position for the checking of the succeeding garment.

The invention has been described in one of its preferred forms, particularly suitable for men's or boys' trousers, riding breeches, knickers, or overalls. Variations thereof appropriate to garments of other types will be apparent to those skilled in the art.

The invention claimed is:

1. A garment measuring device including a baseboard having a dimension scale marked thereon, and an arm pivotally mounted on said baseboard and movable about an axis substantially parallel to both the plane of said baseboard and the axis of said scale, said arm in its lowermost position being adapted to hold a fold of said garment in a definite relation to said scale for measuring a dimension thereof, and being upwardly movable about its pivotal mounting to free the same from said garment.

2. A garment measuring device including a baseboard having a dimension scale marked thereon, an arm pivotally mounted on said baseboard and movable about an axis substantially parallel to both the plane of said baseboard and the axis of said scale, said arm in its lowermost position being adapted to hold a fold of said garment in a definite relation to said scale for measuring a dimension thereof, and being upwardly movable about its pivotal mounting to free the same from said garment, and spring means normally holding said arm in its uppermost position.

3. A garment measuring device including a baseboard having a dimension scale marked thereon, an arm pivotally mounted on said baseboard and movable about an axis substantially parallel to both the plane of said baseboard and the axis of said scale, said arm in its lowermost position being adapted to hold a fold of said garment in a definite relation to said scale for measuring a dimension thereof, and being upwardly movable about its pivotal mounting to free the same from said garment, and an over-center spring adapted to hold said arm in both the upper and lower positions.

4. A garment measuring device including a baseboard having a dimension scale marked thereon, an arm pivotally mounted on said baseboard for movement about an axis substantially perpendicular to the plane of said baseboard, a latch normally holding said arm in a fixed position with an edge thereof perpendicular to the axis of said scale, whereby said arm may hold a fold of said garment in a definite relation to said scale for measuring a dimension thereof, and spring means adapted to move said arm clear of said fold when said latch is released.

BRYAN W. BROWNING.